Figure 1:
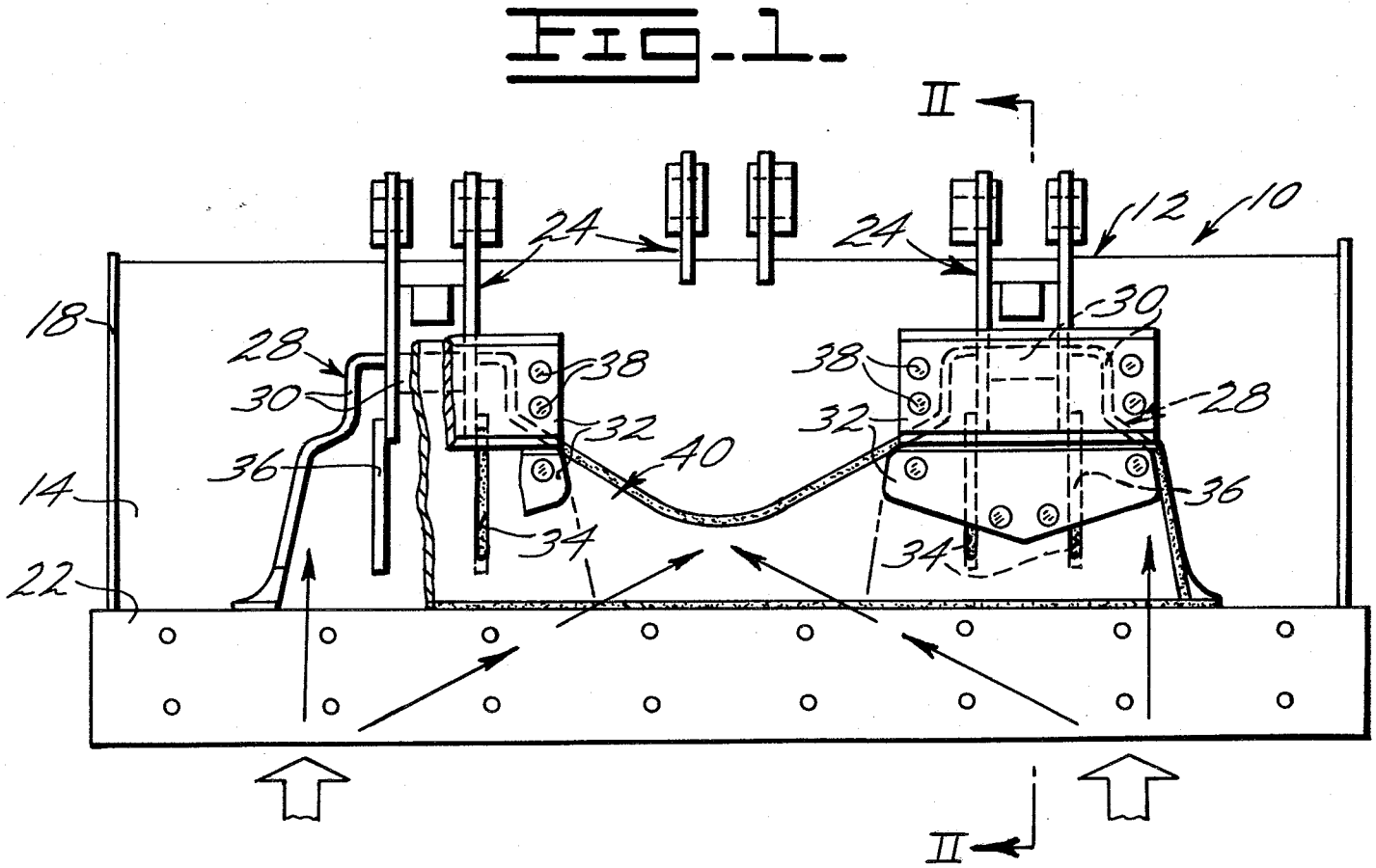
Figure 2:
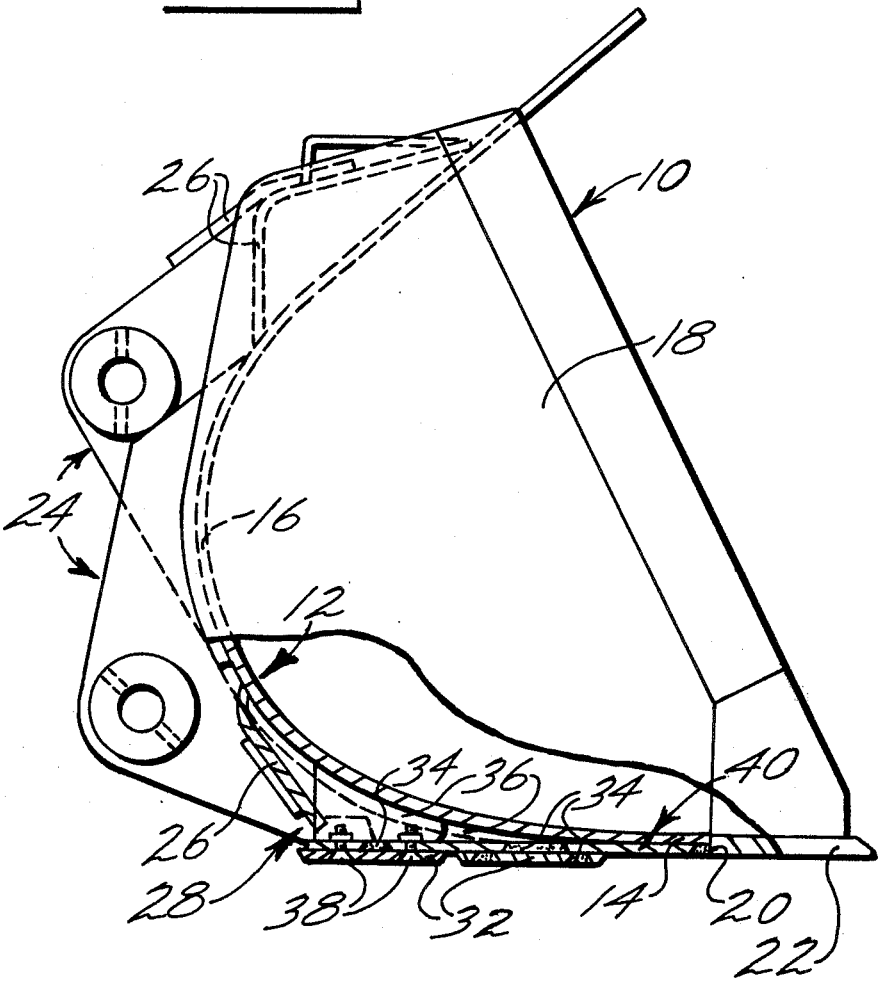

United States Defensive Publication [19] (H) [11] T981,001

McReynolds [43] Apr. 3, 1979

[54] BUCKET REINFORCING STRUCTURE

[75] Inventor: Charles P. McReynolds, Aurora, Ill.

[73] Assignee: Caterpillar Tractor Co., Peoria, Ill.

[21] Appl. No.: 933,313

[22] Filed: Aug. 14, 1978

[51] Int. Cl.[2] ..... E02F 3/00

[52] U.S. Cl. ..... 37/118 R

[57] ABSTRACT

A material handling bucket structure has a shell, a blade connected to the shell and spaced apart mounting brackets having reinforcing structure and a supporting member. The supporting member extends between and connects the mounting brackets and forms a unitary portion of each bracket. The particular configuration of the supporting member effectively transfers and distributes forces applied to the blade between the mounting brackets and the shell.

1 Claim, 2 Sheets Drawing,

5 Pages Specification

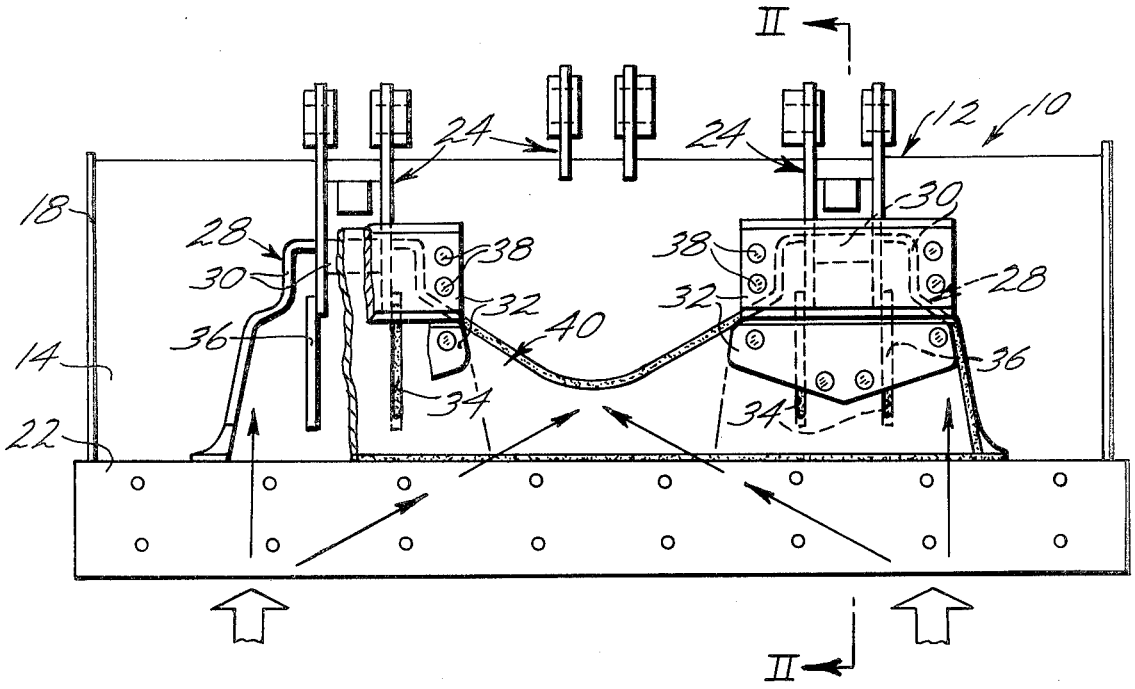

The file of this unexamined application may be inspected and copies thereof may be purchased (849 O.G. 1221, Apr. 9, 1968).